United States Patent
Youn (10) Patent No.: US 7,142,281 B2
(45) Date of Patent: Nov. 28, 2006

(54) METHOD AND SYSTEM FOR PROVIDING A THREE DIMENSIONAL IMAGE

(75) Inventor: Byoung Yi Youn, Ulsan (KR)

(73) Assignee: Georae Ltd., Ulsan Kwang-Yeok-Si (KR)

( * ) Notice: Subject to any disclaimer, the term of this patent is extended or adjusted under 35 U.S.C. 154(b) by 0 days.

(21) Appl. No.: 10/903,508

(22) Filed: Jul. 30, 2004

(65) Prior Publication Data

US 2005/0001982 A1    Jan. 6, 2005

Related U.S. Application Data

(63) Continuation of application No. 10/067,628, filed on Feb. 4, 2002, now Pat. No. 6,778,253, which is a continuation of application No. PCT/KR01/00944, filed on Jun. 2, 2001.

(30) Foreign Application Priority Data

Feb. 6, 2000    (KR)    ............... 10-2000-30643

(51) Int. Cl.
   *G03B 35/00*    (2006.01)
(52) U.S. Cl. ........................... 352/57; 352/60
(58) Field of Classification Search ............... 352/57, 352/60; 348/42, 51, 52; 359/462, 466
See application file for complete search history.

(56) References Cited

U.S. PATENT DOCUMENTS

| | | |
|---|---|---|
| 4,190,856 A | 2/1980 | Ricks |
| 4,743,964 A | 5/1988 | Allard et al. |
| 4,951,075 A | 8/1990 | Tokumaru et al. |
| 4,999,713 A | 3/1991 | Ueno et al. |
| 5,357,277 A | 10/1994 | Nakayoshi et al. |
| 5,625,408 A | 4/1997 | Matsugu et al. |
| 5,638,461 A | 6/1997 | Fridge |
| 5,727,242 A | 3/1998 | Lo et al. |
| 5,805,168 A | 9/1998 | Minakata |
| 5,825,539 A | 10/1998 | Hoshi |
| 5,912,650 A | 6/1999 | Carollo |
| 6,005,607 A | 12/1999 | Uomori et al. |

(Continued)

FOREIGN PATENT DOCUMENTS

JP    06-281878    * 7/1994

(Continued)

OTHER PUBLICATIONS

ViewMaster, TruVue, http://www.studio3d.com/pages2/store_VM.htm, Feb. 4, 2002.

(Continued)

*Primary Examiner*—Rodney Fuller
(74) *Attorney, Agent, or Firm*—Knobbe Martens Olson & Bear LLP.

(57) ABSTRACT

One embodiment of the invention provides a system for providing a three dimensional image from at least two plane images. The system includes first and second image display devices substantially simultaneously outputting first and second plane images, each plane image produced at different positions with respect to an object. The system also includes first and second mirrors configured such that the output first and second plane images are incident to the first and second mirrors and reflected in a direction, respectively. The system provides for either manual or automatic adjustment of the distance between the first and second mirrors such that the incident angle and reflection angle of the plane images are maintained to be substantially identical after each adjustment.

17 Claims, 6 Drawing Sheets

U.S. PATENT DOCUMENTS

| | | |
|---|---|---|
| 6,042,231 A | 3/2000 | Fateh |
| 6,172,700 B1 | 1/2001 | Obata |
| 6,175,379 B1 | 1/2001 | Uomori et al. |
| 6,178,043 B1 | 1/2001 | Son et al. |
| 6,268,880 B1 | 7/2001 | Uomori et al. |
| 6,388,666 B1 | 5/2002 | Murray |
| 6,417,880 B1 | 7/2002 | Uomori et al. |
| 6,449,309 B1 | 9/2002 | Tabata |
| 6,507,359 B1 * | 1/2003 | Muramoto et al. ........... 348/47 |
| 6,747,610 B1 | 6/2004 | Taima et al. |
| 6,752,498 B1 | 6/2004 | Covannon et al. |
| 2001/0052123 A1 | 12/2001 | Kawai |
| 2003/0206653 A1 | 11/2003 | Katayama et al. |

FOREIGN PATENT DOCUMENTS

| | | |
|---|---|---|
| JP | 09-074573 | 3/1997 |
| JP | 2002-92656 | 3/2002 |
| KR | 1998-073048 | 11/1998 |
| KR | 1999-0048195 | 7/1999 |
| KR | 0327874 | 2/2002 |
| KR | 2002-19118 | 3/2002 |
| KR | 2002-79268 | 10/2002 |

OTHER PUBLICATIONS

View-Master, http://www.fisher-price.com/us/view-master/, Feb. 4, 2002.

View-Master, http://www.fisher-price.com/us/view-master/Default.asp?catid=VMviewer, Feb. 4, 2002.

Welcome to Stereographer.com, http://www.stereographer.com/, Feb. 4, 2002.

Views and Viewers, http://www.stereographer.com/viewers.html, Feb. 4, 2002.

Links and Resources, http://www.stereographer.com/links.html, Feb. 4, 2002.

* cited by examiner

METHOD AND SYSTEM FOR PROVIDING A THREE DIMENSIONAL IMAGE

RELATED APPLICATIONS

This application is a continuation of U.S. patent application Ser. No. 10/067,628 filed on Feb. 4, 2002, now U.S. Pat. No. 6,778,253, which is a continuation of PCT/KR01/00944, filed Jun. 2, 2001.

BACKGROUND OF THE INVENTION

1. Field of the Invention

The present invention relates to a method and system for providing a three dimensional (3-D) image, and more particularly, to a method and system for displaying a 3-D image by combining two typical mirrors and two plane image display devices.

2. Description of the Related Technology

A 3-D image provides a viewer with a sense of depth and distance between objects in the image, as well as a sense of three dimensions with respect to each objects (e.g., person) in the image. Presently, most images are only dimensional and various studies have been carried out to determine how to overcome such a limitation.

Most technologies which enable a 3-D image are based on the fact that a human being has two eyes. The principle of perceiving an object in three dimensions by a human being lies in that two eyes which are horizontally spaced apart a predetermined distance from each other, for example, about 7.5 cm and 5 cm for adults and children, respectively, receive an object through the retina at different angles. An image of the object one sees is transferred to the cerebrum via a visual nerve.

Thus, in a conventional method of providing a 3-D image to a viewer, two images are presented in a shutter or refraction manner so as to be seen independently by the left and right eyes.

Although there is a conventional method of realizing a 3-D image by using LCD eyeglasses, this additional apparatus is not commonly used and is limited in use. Even when this conventional apparatus is used, if separation of the left and right images is not complete, images overlap each other or an image flickers due to an optical interference phenomenon.

SUMMARY OF CERTAIN INVENTIVE ASPECTS

One aspect of the invention provides a system for providing a three dimensional image from at least two plane images. The system comprises first and second image display devices substantially simultaneously outputting first and second plane images, each plane image produced at different positions with respect to an object; a first mirror configured such that the output first plane image is incident to the first mirror and reflected in a direction; and a second mirror configured such that the output second plane image is incident to the second mirror and reflected in the direction, wherein the first and second display devices are located on opposite sides of the first and second mirrors, and wherein the system provides for either manual or automatic adjustment of the distance between the first and second mirrors such that the incident angle and reflection angle of the plane images are maintained to be substantially identical after each adjustment.

Another aspect of the invention provides a system for providing a three dimensional image from at least two plane images. The system comprises first and second image display devices configured to i) receive first and second plane images of an object and ii) invert the left and right sides of the received first and second plane images, respectively, and iii) substantially simultaneously output the inverted first and second plane images, respectively, each image being produced at different positions with respect to the object; a first mirror configured such that the output first plane image is incident to the first mirror and reflected in a direction; and a second mirror configured such that the output second plane image is incident to the second mirror and reflected in the direction, wherein the first and second display devices are located on opposite sides of the first and second mirrors, and wherein the system provides for either manual or automatic adjustment of the distance between the first and second mirrors such that the incident angle and reflection angle of the plane images are maintained to be substantially identical after each adjustment.

Another aspect of the invention provides a system for providing a three dimensional image from at least two plane images. The system comprises a first image display device inverting the left and right sides of a first plane image of an object, and outputting the inverted first plane image; a second image display device outputting a second plane image of the object, the first and second images being produced at different positions with respect to the object, wherein the first and second image display devices are configured to output substantially simultaneously the inverted first image and the second image, respectively; and a mirror arranged such that the inverted first plane image is incident from the first image display device to the mirror and reflected in a direction, wherein the first and second display devices are located on opposite sides of the mirror, wherein the second display device is arranged to output the second plane image in the direction, and wherein the system provides for either manual or automatic adjustment of the distance between the mirror and the second image display device such that the incident angle and reflection angle of the inverted first plane image are maintained to be substantially identical after each adjustment.

Still another aspect of the invention provides a method of providing a three dimensional image from at least two plane images. The method comprises substantially simultaneously outputting first and second plane images of an object, each image being produced at different positions with respect to the object; configuring a first mirror such that the output first plane image is incident to the first mirror and reflected in a direction; configuring a second mirror such that the output second plane image is incident to the second mirror and reflected in the direction; and providing for either manual or automatic adjustment of the distance between the first and second mirrors such that the incident angle and reflection angle of the plane images are maintained to be substantially identical after each adjustment.

DESCRIPTION OF CERTAIN INVENTIVE EMBODIMENTS

Figure 1:
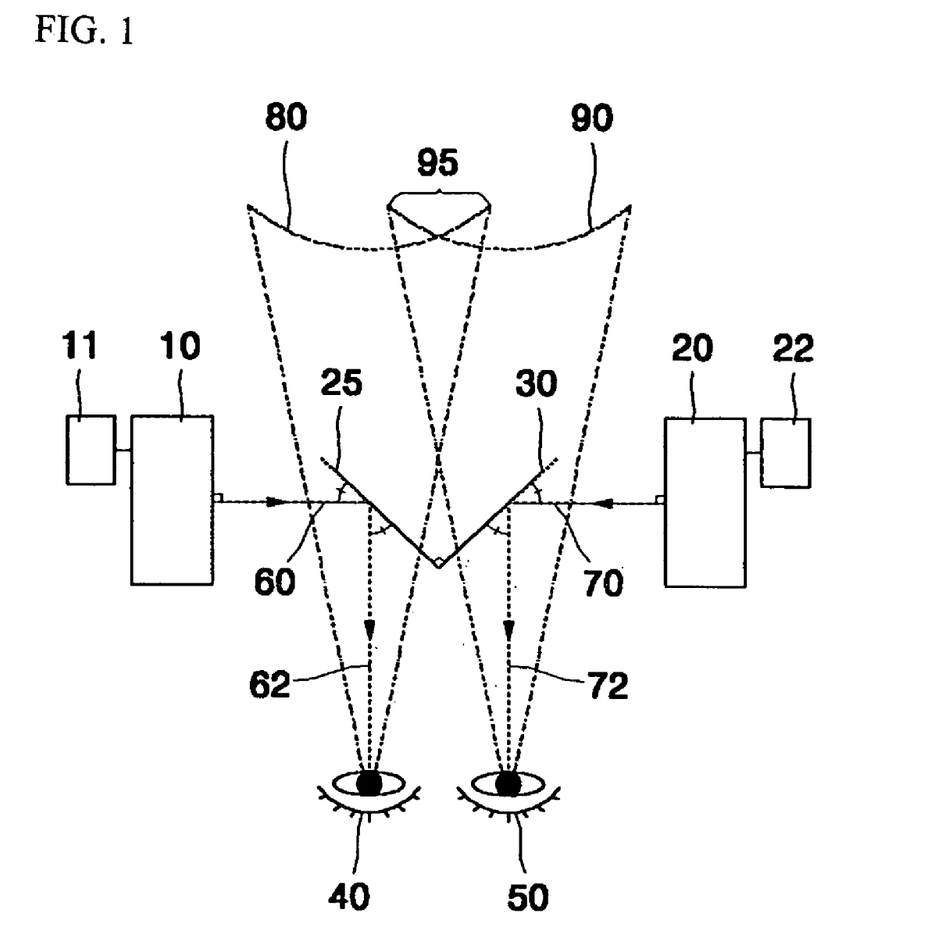
FIG. 1 is a view showing the configuration of one embodiment of an apparatus for displaying a 3-D image according to one aspect of the present invention, in which each of an incident angle and a reflection angle is about 45°.

Referring to FIG. 1, a left plane display device 10 and a right plane display device 20 may be implemented as any one of typical television monitors, wall-mount flat TVs, computer monitors, LCD image output devices, and the like. Also, a variety of image output devices for outputting only a 2-dimensional plane image can be selected. Images are inverted by left and right inverting apparatuses 11 and 22 and input to the left and right plane display devices 10 and 20, respectively. The inverted images output from the left and right plane display devices 10 and 20 are incident at an angle of about 45° on a left reflection mirror 25 and a right reflection mirror 30 disposed at the center of the apparatus (60 and 70) and then inverted. The inverted images are transferred to each of the left and right eyes 40 and 50 of a viewer who watches the image as the original image, by being reflected by the left and right reflection mirrors 25 and 30 at an angle of about 45° which is the same as the incident angle. According to a visual transfer process in a human body, images perceived by eyes are transferred to the cerebrum as a left virtual image 80 and a right virtual image 90 by crossing each other. Therefore, by an image synthesizing process, plane images are perceived as a three-dimensional image (95).

In certain embodiments, the positions of the left and right inverting apparatuses 11 and 22, the left and right plane display apparatuses 10 and 20, and the left and right reflection mirrors 25 and 30 can be adjusted automatically or manually such that the incident angle and reflection angle of images are maintained to be identical. The incident angle and reflection angle are preferably adjusted within a range of about 30–50°. In FIG. 1, the incident angle and reflection angle are adjusted by about 45°. Also, the left and right reflection mirrors 25 and 30 are preferably arranged to be V-shaped with respect to a viewer. Typical 100% reflection mirrors are used as the reflection mirrors.

Various embodiments of the present invention do not adopt a conventional digital image synthesizing method, but realize a 3-D image 95 with improved image quality in a mechanical method, that is, by reflecting plane images input from both sides by using the mirrors 25 and 30. Also, one embodiment of the present invention is advantageous in that the size of a screen can be adjusted by adjusting the angle of the mirrors 25 and 30. Also, since the width of a screen can be adjusted freely, a 3-D image can be displayed on a large screen without using an additional apparatus such as a lens or prism, and glasses for view. Further, the distance from the display apparatus and the screen can be adjusted and a focus type 3-D image and a balance type 3-D image can be displayed. Further, a still image and a motion picture can be displayed in three dimension.

Figure 2:
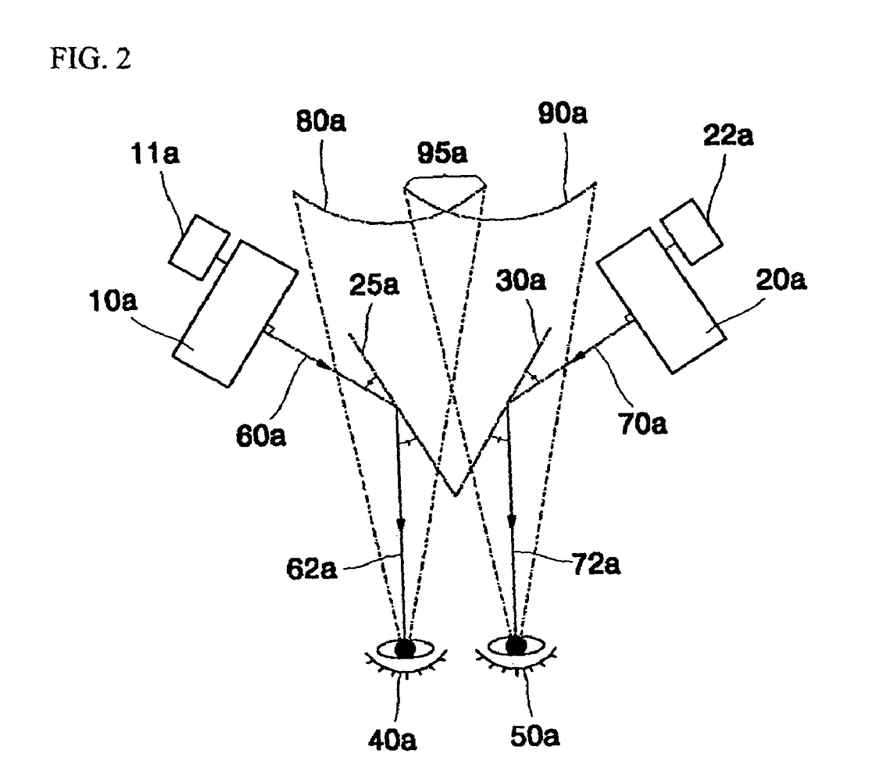
FIG. 2 is a view showing the configuration of an apparatus for displaying a 3-D image according to another aspect of the present invention, in which each of an incident angle and a reflection angle is about 30°.

FIG. 2 shows the configuration of an apparatus for displaying a 3-D image according to one aspect of the present invention, in which each of an incident angle and a reflection angle is about 30°. Referring to FIG. 2, a left plane display device 10a and a right plane display device 20a may be implemented as any one of typical television monitors, wall-mount flat TVs, computer monitors, and LCD image output devices. Also, a variety of image output devices for outputting only a 2-dimensional plane image can be selected. Images are inverted by left and right inverting apparatuses 11a and 22a and output from the left and right plane display devices 10a and 20a. The inverted images output from the left and right plane display devices 10a and 20a are incident on left and right reflection mirrors 25a and 30a disposed at the center at an arbitrary angle of about 30° (60a and 70a) and reflected at the same angle to be transferred (62a, 72a) to each of left and right eyes 40a and 50a of a viewer who watches the image. According to a visual transfer process in a human body, images perceived by eyes are transferred to the cerebrum as a left virtual image 80a and a right virtual image 90a by crossing each other. Therefore, by an image synthesizing process, plane images are perceived as a three-dimensional image (95a).

In certain embodiments, the positions of the left and right plane display apparatuses 10a and 20a and the left and right reflection mirrors 25a and 30a can be adjusted automatically or manually such that the incident angle and reflection angle of images are maintained to be identical. The incident angle and reflection angle are preferably adjusted within a range of about 30–50°. In FIG. 2, the incident angle and reflection angle are adjusted by about 30°. Also, the left and right reflection mirrors 25a and 30a are preferably arranged to be V-shaped with respect to a viewer. Typical reflection mirrors are used as the reflection mirrors 25a and 30a.

Figure 3:
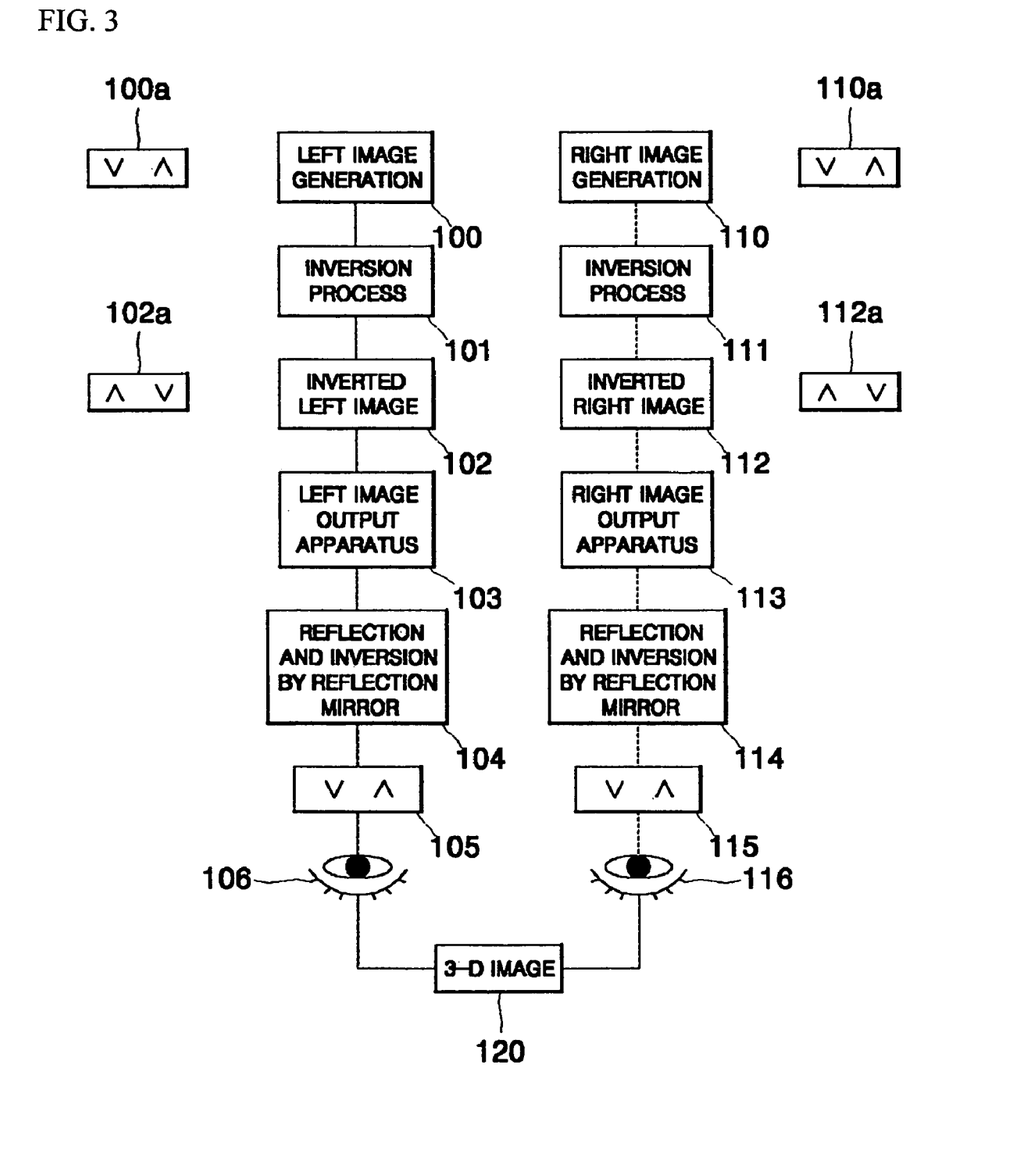
FIG. 3 is a block diagram for explaining steps of inversion and re-inversion of an image according to another aspect of the present invention.

FIG. 3 is a block diagram for explaining steps of inversion and re-inversion of an image according to another aspect of the present invention. According to FIG. 3, after a left image 100a is generated (100), the left image 100a is inversion processed (101) to generate an inverted left image 102a. When the inverted left image 102a is output from a left image output apparatus 103 and reflected by a reflection mirror the inverted left image 102a is re-inverted (104) and restored to the original left image 105. The restored original image is perceived by a left eye 106. Meanwhile, a right image 110a is generated (110) and inversion processed (111) to generate an inverted right image 112a. When the inverted right image 112a is output from a right image output apparatus 113 and reflected by a reflection mirror, the reflected image is re-inverted (114) and restored to the original image 115. The restored original image is perceived to a right eye 116.

The left image and right image individually inverted and re-inverted and finally perceived by the left and right eyes 106 and 116, respectively are synthesized into a virtual image and is are perceived as a 3-D image 120, so that the purpose of one embodiment of the present invention is sufficiently achieved.

Also, an image display apparatus to realize synthesis of images according to another aspect of the present invention will now be described with reference to FIGS. 4 and 5.

Figure 4:
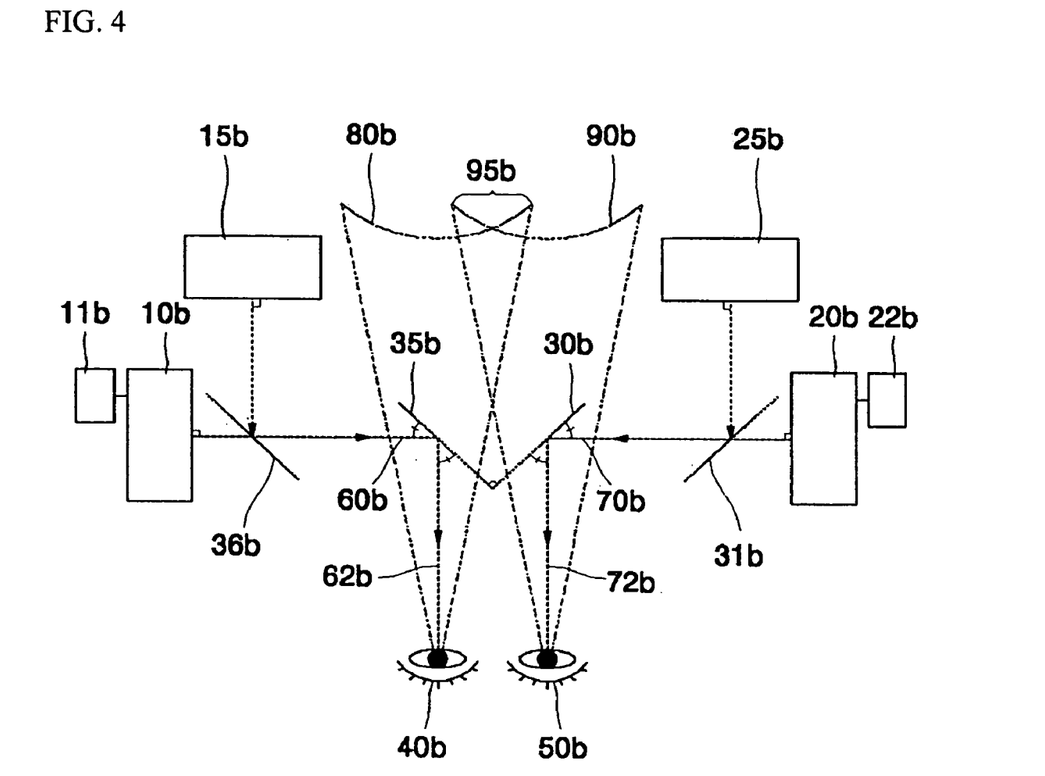
FIG. 4 is a view showing the configuration of an apparatus for displaying a 3-D image according to one embodiment of the present invention to realize synthesis of images.

FIG. 4 is a view showing the configuration of an apparatus for displaying a 3-D image according to one embodiment of the present invention to realize synthesis of images. As shown in FIG. 4, a first left plane image display device 10b, a second left plane image display device 15b, a first right plane image display device 20b, and a second right plane image display device 25b may be implemented as any one of typical television monitors, wall-mount flat TVs, computer monitors, and LCD image output devices. Also, a variety of image output devices for outputting only a 2-dimensional plane image can be selected.

The first left plane image display device 10b receives an image which is inversion processed by an inverting apparatus 11b, and outputs the received inverted image to be input to a mirror 36b. The second left plane image display device 15b outputs the original image to be input to the mirror 36b. Here, a semi-transparent mirror having a transmittance of about 50% and a reflectance of about 50% is used as the mirror 36b so that the images output from the first left plane image display device 10b and the second left plane image display device 15b are synthesized by the mirror 36b.

The first right plane image display device 20b receives an image which is inversion processed by an inverting apparatus 22b, and outputs the received inverted image to be input to a mirror 31b. The second right plane image display device 25b outputs the original image to be input to the mirror 31b. Here, a semi-transparent mirror having a transmittance of about 50% and a reflectance of about 50% is used as the mirror 31b so that the images output from the first right plane image display device 20b and the second right plane image display device 25b are synthesized by the mirror 31b.

Thus, the images respectively synthesized by the mirrors 36b and 31b are incident on a left reflection mirror 35b and a right reflection mirror 30b, respectively at an identical angle of about 45° (60b and 70b), inverted and reflected thereby at the same angle as the incident angle (62b and 72b), and transferred to left and right eyes 40b and 50b of a viewer who watches the image as the original image. According to a visual transfer process in a human body, images perceived by eyes are transferred to the cerebrum as a left virtual image 80b and a right virtual image 90b by crossing each other. Therefore, by an image synthesizing process, plane images are perceived as a three-dimensional image (95b).

In certain embodiments, the positions of the first and second left and right display devices 10b, 15b, 20b, and 25b, the inverting apparatuses 11b, and 22b, the mirrors 31b and 36b, and the left and right reflection mirrors 30b and 35b can be adjusted automatically or manually such that the incident angle and reflection angle of images are maintained to be identical. The incident angle and reflection angle are preferably adjusted within a range of about 30–50°. In FIG. 4, the incident angle and reflection angle are adjusted by about 45°. Also, the left and right reflection mirrors 35b and 30b are preferably arranged to be V-shaped with respect to a viewer. Typical 100% reflection mirrors are used as the reflection mirrors 30b and 35b.

Figure 5:
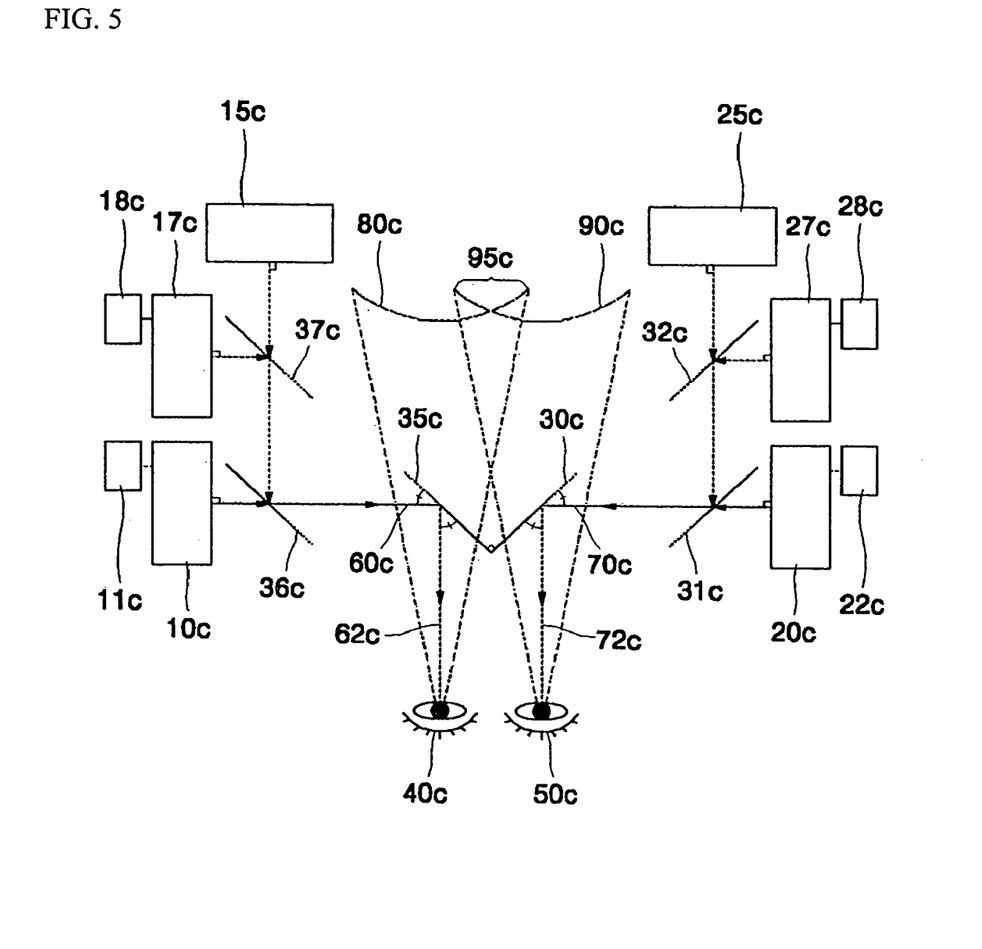
FIG. 5 is a view showing the configuration of an apparatus for displaying a 3-D image according to another embodiment of the present invention to realize synthesis of images.

FIG. 5 is a view showing the configuration of an apparatus for displaying a 3-D image according to another embodiment of the present invention to realize synthesis of images. As shown in FIG. 5, a first left plane image display device 10c, a second left plane image display device 15c, a third left plane image display device 17c, a first right plane image display device 20c, a second right plane image display device 25c, and a third plane right image display device 27c may be any of typical television monitors, wall-mount flat TVs, computer monitors, and LCD image output devices. Also, a variety of image output devices for outputting a 2-dimensional plane image only can be selected.

The second left plane image display device 15c outputs the original image to a mirror 37c. The third left plane image display device 17c outputs an image which is inversion processed by an inverting apparatus 18c to the mirror 37c. Here, a semi-transparent mirror having a transmittance of about 50% and a reflectance of about 50% can be used as the mirror 37c, so that the images output from the second left plane image display device 15c and the third left plane image display device 17c are synthesized by the mirror 37c.

The image synthesized by the reflection mirror 37c is incident on a mirror 36c. The first left plane image display device 10c outputs an image which is inversion processed by the inverting apparatus 11c, to the reflection 36c. Here, a semi-transparent mirror having a transmittance of about 50% and a reflectance of about 50% can be used as the mirror 36c, so that the image synthesized by the mirror 37c and the image output from the first left plane image display device 10c are synthesized by the mirror 36c.

The second right plane image display device 25c outputs the original image to a mirror 32c. The third right plane image display device 27c outputs an image which is inversion processed by an inverting apparatus 28c to the mirror 32c. Here, a semi-transparent mirror having a transmittance of about 50% and a reflectance of about 50% can be used as the mirror 32c, so that the images output from the second right plane image display device 25c and the third right plane image display device 27c are synthesized by the mirror 32c.

The image synthesized by the mirror 32c is incident on a mirror 31c. The first right plane image display device 20c outputs an image which is inversion processed by the inverting apparatus 22c, to the reflection mirror 31c. Here, a semi-transparent mirror having a transmittance of about 50% and a reflectance of about 50% can be used as the mirror 31c, so that the images synthesized by the mirror 32c and the image output from the first right plane image display device 20c are synthesized by the mirror 31c.

Thus, the images synthesized by the reflection mirror 36c and the reflection mirror 31c are incident on a left reflection mirror 35c and a right reflection mirror 30c which are disposed at the center, at the same angle of 45° (60c and 70c), respectively, and then inverted. The inverted images are reflected at the same angle as the incident angle (62c and 72c) and transferred to the left and right eyes 40c and 50c of a viewer who watches a screen, as the original images. According to a visual transfer process in a human body, images perceived by eyes are transferred to the cerebrum as a left virtual image 80c and a right virtual image 90c by crossing each other. Therefore, by an image synthesizing process, plane images are perceived as a three-dimensional image (95c).

Figure 6:
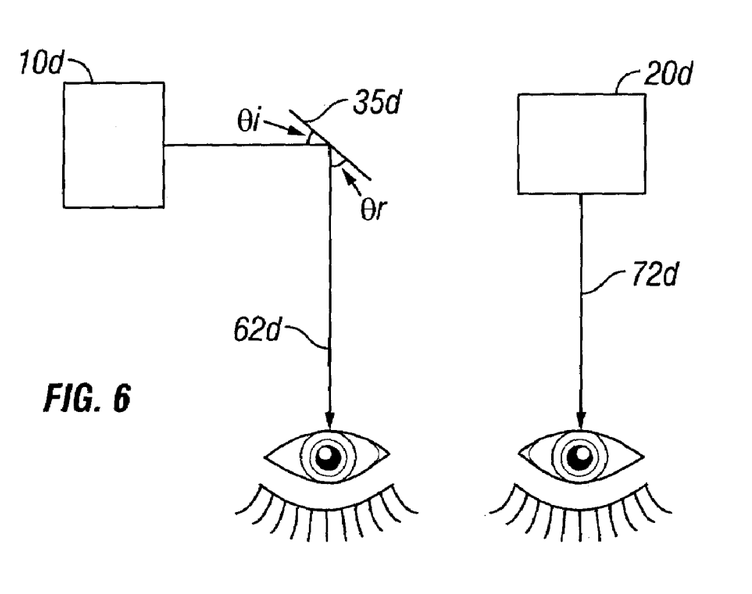
FIG. 6 is a view showing the configuration of an apparatus for displaying a 3-D image according to still another embodiment of the present invention to realize synthesis of images.

In certain embodiments, the positions of the plane display devices 10c, 15c, 17c, 20c, 25c, and 27c, the inverting apparatuses 11c, 18c, 22c, and 28c, the mirrors 31c, 32c36c and 37c and the reflection mirrors 30c and 35c, can be are adjusted automatically or manually such that the incident angle and reflection angle of images are maintained to be identical. The incident angle and reflection angle are preferably adjusted within a range of about 30–50°. In FIG. 5, the incident angle and reflection angle are adjusted by about 45°. Also, the left and right reflection mirrors 35c and 30c are preferably arranged to be V-shaped with respect to a viewer. Typical 100% reflection mirrors are used as the reflection mirrors 30c and 35c. Still another embodiment provides a system for providing a three dimensional image from at least two plane images as shown in FIG. 6. The system comprises a first image display device 10d inverting the left and right sides of a first plane image of an object, and outputting the inverted first plane image. The system also comprises a second image display device 20d outputting a second plane image of the object, the first and second images being produced at different positions with respect to the object, wherein the first and second image display devices 10d and 20d are configured to output substantially simultaneously the inverted first image and the non-inverted second image, respectively. The system further comprises a mirror 35d arranged such that the inverted first plane image is incident from the first image display device 10d to the mirror 35d and reflected in a direction 62d. In this embodiment, the first and second display devices 10d and 20d are located on opposite sides of the mirror 35d and the second display device 20d is arranged to output the second plane image in the direction 72d. Furthermore, the system provides for either manual or automatic adjustment of the distance between the mirror 35d and the second image display device 20d such that the incident angle ($\theta_i$) and reflection angle ($\theta_r$) of the inverted first plane image are maintained to be substantially identical after each adjustment.

As described above, in the apparatus for displaying a 3-D image according to certain embodiments of the present invention, unlike the conventional 3-D display apparatus having a complicated structure but no general usability, a 3-D image can be easily realized without additional apparatuses. This is accomplished by arranging the two plane image display devices and image inverting apparatuses to the left and right sides and the reflection mirrors in the middle therebetween and adjusting the incident and reflection angles of the reflection mirrors. The apparatus for displaying a 3-D image according to the present invention can be used for a head mounted display, a 3-D game console, a 3-D video broadcasting apparatus, a computer 3-D image communication apparatus, and various simulators.

While this invention has been particularly shown and described with reference to various embodiments thereof, it will be understood by those skilled in the art that various changes in form and details may be made therein without departing from the spirit and scope of the invention as defined by the appended claims.

What is claimed is:

1. A system for providing a three dimensional image from at least two plane images, comprising:
    first and second image display devices substantially simultaneously outputting first and second plane images, each plane image produced at different positions with respect to an object;
    a first mirror configured such that the output first plane image is incident to the first mirror and reflected in a direction; and
    a second mirror configured such that the output second plane image is incident to the second mirror and reflected in the direction,
    wherein the first and second display devices are located on opposite sides of the first and second mirrors, and
    wherein the system provides for either manual or automatic adjustment of the distance between the first and second mirrors without moving the first and second image display devices such that the incident angle and reflection angle of the plane images are maintained to be substantially identical after each adjustment.

2. The system of claim 1, wherein the first and second mirrors as a whole are arranged to provide a substantially V shaped mirror with respect to a viewer's eyes.

3. The system of claim 1, further comprising first and second inverting devices configured to i) receive first and second plane images, respectively, ii) invert the left and right sides of the received first and second plane images, respectively, and iii) provide the inverted first and second plane images to the first and second display devices, respectively.

4. The system of claim 3, wherein the first and second plane image display devices include the left and right image inverting devices therein, respectively.

5. The system of claim 1, wherein the first and second display devices are configured to i) receive the first and second plane images, respectively, ii) invert the left and right sides of the received first and second plane images, respectively, and iii) output the inverted first and second plane images to the first and second mirrors, respectively.

6. The system of claim 1, wherein at least one of the first and second mirrors provides light transmittance of about 50% and reflectance of about 50%.

7. The system of claim 1, wherein each of the display devices comprises one of a computer monitor, a TV, a LCD, or any other plane image display device.

8. A system for providing a three dimensional image from at least two plane images, comprising:
    first and second image display devices configured to i) receive first and second plane images of an object and ii) invert the left and right sides of the received first and second plane images, respectively, and iii) substantially simultaneously output the inverted first and second plane images, respectively, each image being produced at different positions with respect to the object;
    a first mirror configured such that the output first plane image is incident to the first mirror and reflected in a direction; and
    a second mirror configured such that the output second plane image is incident to the second mirror and reflected in the direction,
    wherein the first and second display devices are located on opposite sides of the first and second mirrors, and
    wherein the system provides for either manual or automatic adjustment of the distance between the first and second mirrors without moving the first and second image display devices such that the incident angle and reflection angle of the plane images are maintained to be substantially identical after each adjustment.

9. The system of claim 8, wherein the first and second display devices are further configured to directly display the inverted images without use of mirrors.

10. The system of claim 8, wherein each of the first and second mirrors provides light reflectance that is greater than 50%.

11. The system of claim 8, wherein each of the display devices comprises one of a computer monitor, a TV, a LCD, or any other plane image display device.

12. A system for providing a three dimensional image from at least two plane images, comprising:
    a first image display device inverting the left and right sides of a first plane image of an object, and outputting the inverted first plane image;
    a second image display device outputting a second plane image of the object, the first and second images being produced at different positions with respect to the object, wherein the first and second image display devices are configured to output substantially simultaneously the inverted first image and the second image, respectively; and a mirror arranged such that the inverted first plane image is incident from the first image display device to the mirror and reflected in a direction, wherein the first and second display devices are located on opposite sides of the mirror, wherein the second display device is arranged to output the second plane image in the direction, and wherein the system provides for either manual or automatic adjustment of the distance between the mirror and the second image display device such that the incident angle and reflection angle of the inverted first plane image are maintained to be substantially identical after each adjustment.

13. The system of claim 12, wherein each of the display devices comprises one of a computer monitor, a TV, a LCD, or any other plane image display device.

14. A method of providing a three dimensional image from at least two plane images, comprising:

substantially simultaneously outputting first and second plane images of an object, from first and second image display devices, each image being produced at different positions with respect to the object;

configuring a first mirror such that the output first plane image is incident to the first mirror and reflected in a direction;

configuring a second mirror such that the output second plane image is incident to the second mirror and reflected in the direction; and providing for either manual or automatic adjustment of the distance between the first and second mirrors without moving the first and second image display devices such that the incident angle and reflection angle of the plane images are maintained to be substantially identical after each adjustment.

15. The method of claim 14, further comprising:

receiving first and second plane images; and inverting the left and right sides of the received first and second plane images, and wherein the outputting comprises displaying the inverted first and second plane images.

16. The method of claim 14, further comprising adjusting the first and second mirrors such that incident and reflection angles of the first and second plane images are in a range of about 30° to 50°.

17. A system for providing a three dimensional image from at least two plane images, comprising:

means for substantially simultaneously outputting first and second plane images of an object from first and second image display devices, each image being produced at different positions with respect to the object;

means for configuring a first mirror such that the output first plane image is incident to the first mirror and reflected in a direction;

means for configuring a second mirror such that the output second plane image is incident to the second mirror and reflected in the direction; and means for providing for either manual or automatic adjustment of the distance between the first and second mirrors without moving the first and second image display devices such that the incident angle and reflection angle of the plane images are maintained to be substantially identical after each adjustment.

* * * * *